(12) United States Patent
Audebert et al.

(10) Patent No.: US 7,162,631 B2
(45) Date of Patent: *Jan. 9, 2007

(54) METHOD AND SYSTEM FOR SCRIPTING COMMANDS AND DATA FOR USE BY A PERSONAL SECURITY DEVICE

(75) Inventors: Yves Louis Gabriel Audebert, Los Gatos, CA (US); Olivier Clemot, Fremont, CA (US)

(73) Assignee: Activcard, Suresnes Cedex (FR)

( * ) Notice: Subject to any disclaimer, the term of this patent is extended or adjusted under 35 U.S.C. 154(b) by 794 days.

This patent is subject to a terminal disclaimer.

(21) Appl. No.: 09/985,344

(22) Filed: Nov. 2, 2001

(65) Prior Publication Data

US 2003/0088691 A1 May 8, 2003

(51) Int. Cl.
G06F 15/16 (2006.01)
H04L 9/00 (2006.01)

(52) U.S. Cl. ............... 713/160; 713/162; 713/159; 713/172; 709/230; 705/67

(58) Field of Classification Search ............... 713/172, 713/201, 200, 187, 150, 160, 162, 159; 705/66, 705/41; 709/230, 203, 229
See application file for complete search history.

(56) References Cited

U.S. PATENT DOCUMENTS

| 5,276,735 | A |   | 1/1994 | Boebert et al. |
|---|---|---|---|---|
| 5,455,863 | A |   | 10/1995 | Brown et al. |
| 5,499,297 | A |   | 3/1996 | Boebert |
| 5,778,071 | A |   | 7/1998 | Caputo et al. |
| 5,917,168 | A |   | 6/1999 | Nakamura et al. |
| 5,944,821 | A |   | 8/1999 | Angelo |
| 5,991,407 | A |   | 11/1999 | Murto |
| 6,005,942 | A | * | 12/1999 | Chan et al. ............... 713/187 |
| 6,018,779 | A |   | 1/2000 | Blumenau |
| 6,101,225 | A |   | 8/2000 | Harrison et al. |
| 6,101,254 | A |   | 8/2000 | Thiriet |
| 6,105,008 | A |   | 8/2000 | Davis et al. |
| 6,108,789 | A |   | 8/2000 | Dancs et al. |
| 6,128,338 | A |   | 10/2000 | Behaghel et al. |
| 6,131,811 | A |   | 10/2000 | Gangi |
| 6,144,671 | A |   | 11/2000 | Perinpanathan et al. |
| 6,181,735 | B1 | * | 1/2001 | Sarat ...................... 375/222 |
| 6,192,473 | B1 |   | 2/2001 | Ryan, Jr. et al. |
| 6,195,700 | B1 | * | 2/2001 | Bender et al. ............ 709/230 |
| 6,233,683 | B1 | * | 5/2001 | Chan et al. ............... 713/172 |

(Continued)

FOREIGN PATENT DOCUMENTS

DE 19522527 1/1997

(Continued)

OTHER PUBLICATIONS

N. Itoi, et al., "Secure Internet Smartcards," CITI Technical Report 00-6, Center for Information Technology Integration, University of Michigan, www.citi.umich.edu/projects/smartcard/, ppgs. 1-12, Aug. 24, 2000.

(Continued)

Primary Examiner—Gilberto Barron, Jr.
Assistant Examiner—Samson Lemma
(74) Attorney, Agent, or Firm—Stevens, Davis, Miller & Mosher, LLP

(57) ABSTRACT

System and method for optimizing communications using a communications pipe over a network. This invention provides means to locally execute an APDU script and collect APDU responses locally for batch transfer to a remote server.

16 Claims, 6 Drawing Sheets

U.S. PATENT DOCUMENTS

| | | | |
|---|---|---|---|
| 6,279,047 | B1 | 8/2001 | Bublitz et al. |
| 6,385,729 | B1 | 5/2002 | DiGiorgio et al. |
| 6,434,238 | B1 | 8/2002 | Chaum et al. |
| 6,481,632 | B1 | 11/2002 | Wentker et al. |
| 6,575,360 | B1 | 6/2003 | Hagn |
| 6,602,469 | B1 | 8/2003 | Maus et al. |
| 6,694,436 | B1 * | 2/2004 | Audebert ................. 713/200 |
| 6,718,314 | B1 | 4/2004 | Chaum et al. |
| 6,751,671 | B1 | 6/2004 | Urien |
| 6,807,561 | B1 * | 10/2004 | Lagosanto et al. ......... 709/203 |
| 6,892,301 | B1 | 5/2005 | Hansmann et al. |
| 6,944,650 | B1 | 9/2005 | Urien |
| 2001/0039587 | A1 * | 11/2001 | Uhler et al. ............... 709/229 |
| 2002/0025046 | A1 | 2/2002 | Lin |
| 2002/0040936 | A1 | 4/2002 | Wentker et al. |

FOREIGN PATENT DOCUMENTS

| | | |
|---|---|---|
| DE | 19724901 | 12/1998 |
| EP | 0911772 | 4/1999 |
| EP | 0923211 | 6/1999 |
| FR | 2779018 | 11/1999 |
| WO | 9852161 | 11/1998 |
| WO | 9962037 | 12/1999 |
| WO | 9962210 | 12/1999 |
| WO | 0116900 | 3/2001 |
| WO | 0122373 | 3/2001 |
| WO | 0159730 | 8/2001 |

OTHER PUBLICATIONS

International Search Report dated Mar. 9, 2002.

P. Trommler, et al.; "Smart cards and the OpenCard Framework," Java World, Jan., 1998, XP002173639, pp. 1-12.

Global Platform, Open Platform, Terminal Specification, Version 1.5, Nov. 1999.

Global Platform, Open Platform Terminal Framework, API Version 1.5.4, Jul. 20, 2000.

Global Platform, Multi Application- Smart Card Management Systems, Global Platform Functional Requirements, Version 3.3, Nov. 2000.

ISO/IEC 7816-4: 1995/Amd.1:1997(E) Information technology, Identification card, integrated circuit(s) cards with contacts, Part 4: Interindustry commands for interchange, Amendment 1.

ISO/IEC 7816-4: 1995(E) Information technology, Identification cards, Integrated circuit(s) cards with contacts, Part 4: Interindustry commands for interchange.

ISO/IEC 7816-5: 1994/Amd. 1: 1996(E) Identification cards, Integrated circuit(s) cards with contacts, Part 5: Numbering system and registration procedure for application identifiers, Amendment 1.

ISO/IEC 7816-5: 1994(E) Identification cards, Integrated circuit(s) cards with contact, Part 5: Numbering system and registration procedure for application identifiers.

Java Card 2.1 Application Program Interface Sun Microsystems, Inc. Final Revision 1.1, Jun. 7, 1999.

Chen, Zhiqun, "How to write a Java Card applet: a Developer's Guide", Javaword, Jul. 1999.

Chen, Zhiqun et al., "Understanding Java Card 2.0," Javaworld, Mar. 1998.

Posey, Brien, "Using Smart Cards with Windows 2000," TechCrawler.com, Sep. 28, 2000.

ISO/IEC 7816-4: 1995/Amd.1:1997(E) Information technology-Identification cards-Integrated circuit(s) cards with contacts, Part 4: Interindustry commands for interchange, Amendment 1, pp. 1-5, Dec. 15, 1997.

ISO/IEC 7816-4: 1995(E) Information technology-Identification cards-Integrated circuit(s) cards with contacts, Part 4: Interindustry commands for interchange, pp. 1-46, Sep. 1, 1995.

U.S. Appl. No. 09/844,246 entitled "Method And System For Establishing A Remote Connection To A Personal Security Device", filed on Apr. 30, 2001 by Y. Audebert, et al.

U.S. Appl. No. 09/844,439 entitled "Method And System For Authentication Through A Communications Pipe", filed on Apr. 30, 2001 by Y. Audebert, et al.

T. Ebringer, et al.; "Parasitic Authentication To Protect Your E-Wallet," Computer, IEEE Computer Society, Long Beach, CA, US, US, vol. 33, No. 10, Oct. 1, 2000, XP001001747, ISBN: 0018-9162, pp. 54-60.

International Search Report dated Aug. 27, 2002.

International Search Report dated Sep. 3, 2002.

P. Trommler, et al.: "Smart Cards and the OpenCard Framework," Java World, Jan., 1998, XP002173639, pp. 1-12.

European Telecommunications Standards Institute: "Digital Cellular Telecommunications System (Phase 2+) (GSM); Universal Mobile telecommunications System (UMTS); Security Mechanisms for the (U) SIM application toolkit; Stage 2; (3GPP TS 23.048 version 4.1.0 Release 4)" ETSI TS 123 048 V4.1.0, Sep. 2001, pp. 1-35, XP002237189 ETSI Technical Specification.

"Digital Cellular Telecommunications System (Phase 2+) (GSM); Specification of the SIM Application Toolkit for the Subscriber Identity Module—Mobile Equipment (SIM—ME) Interface (GSM 11.14 version 8.3.0 Release 1999)" ETSI TS 101 267 V8.3.0, XX, XX, Aug. 2000, pp. 1-69, 114, 115, XP002222021.

Office Action dated Jan. 17, 2006 in U.S. Appl. No. 10/085,127.

Office Action dated Oct. 20, 2005 in U.S. Appl. No. 09/844,272.

International Search Report dated Apr. 23, 2003.

Jave Card 2.1 Application Programming Interface Sun Microsystems, Inc. Final Revision 1.1, Jun. 7, 1999.

Chen, Zhiqun, "How to write a Java Card applet: a Developer's Guide", Javaworld, Jul. 1999.

* cited by examiner

METHOD AND SYSTEM FOR SCRIPTING COMMANDS AND DATA FOR USE BY A PERSONAL SECURITY DEVICE

CROSS-REFERENCE TO RELATED APPLICATIONS

The present application is related to co-pending U.S. patent application Ser. No. 09/844,246 entitled, "METHOD AND SYSTEM FOR ESTABLISHING A REMOTE CONNECTION TO A PERSONAL SECURITY DEVICE," filed on Apr. 30, 2001, and assigned to the assignee of the present invention. Applicant hereby incorporates by reference the above-mentioned co-pending application, which is not admitted to be prior art with respect to the present invention by its mention here or in the background section that follows.

FIELD OF INVENTION

The present invention relates to a data processing method and system for improving communications through a communications pipe employed over a network between a Personal Security Device (PSD) and a Remote Computer System.

BACKGROUND OF INVENTION

The current art involving the management of information and data contained in a personal security devices (PSD), for example, smart cards, subscriber identity modules (SIM), wireless identification modules (WIM), biometric devices, or combinations thereof, requires discrete low-level commands known in that art as application protocol data units (APDUs) to be sent to a PSD.

The PSD is a reactive device in which a returned response is generated after completion of each command executed or upon encountering an error in execution. The majority of the responses returned by the PSD are simple "processing complete" or equivalent messages. In a networked environment, awaiting the return of such responses unnecessarily ties up network bandwidth and server resources due to the latency of the transactions and relatively slow execution speeds of the PSDs.

A second limitation is due to the relatively low-level nature of the PSD operating environment, which typically requires several sequential APDU commands to be executed in order to accomplish an operation within a PSD. This could be particularly troublesome when a large number of PSDs are being managed from a central server.

Co-pending U.S. patent application Ser. No. 09/844,246, entitled "Method and System for Establishing a Remote Connection to a PSD," and assigned to the assignee of the present invention, describes a communication pipe, which allows a remote server to maintain communications with one or more PSD's over a network which could be susceptible to the foregoing limitations. As such, a means to minimize the potential latency effects imposed on a network is highly desirable.

SUMMARY OF INVENTION

The present invention is directed to a method and system, which resolves the potential latency problems associated with maintaining communications pipes over a network.

To practice this invention, a stack of APDU commands is generated and stored in a command script on the remote computer system. The command script is then sent over a network to a client to be executed locally by a pipe client program. As described in the co-pending U.S. patent application Ser. No. 09/844,246, the pipe client is an API level program which extracts APDUs from incoming message packets and encapsulates APDUs into outgoing message packets.

Upon receiving the command script, the pipe client temporarily stores the command stack in either a memory location or disk file and sequentially sends the APDU commands to the PSD for processing. Sequencing of the APDU commands is accomplished by receipt of an APDU response, which causes the next APDU command to be issued. The APDU responses are likewise temporarily stored in either a memory location or disk file for later transmission to the remote computer system. This process continues until the last APDU command is sent and its complementary APDU response is received and stored in a response script. Once completed, the response script is sent to the remote computer system for processing.

By recording APDU commands in a script and locally capturing the resulting APDU responses, the handshaking between the PSD and remote computer system is significantly reduced thus freeing networking and server resources.

In one embodiment of the invention the accumulated responses are stored as generated by the PSD. In a second embodiment of the invention, the APDUs are compressed to optimize storage and transmission throughput between the PSD and Remote Computer System. The file compression may be performed on the fly by using the file compression options included in Microsoft Windows™ 2000 or NT. An advantage in using the operating system to perform the data compression is the ability to add encryption to the stored and compressed data, which is transparent to the end user. Additional hardware or software data compression techniques may be employed during network communications to further reduce the size and number of packets exchanged between the remote computer system and the PSD.

BRIEF DESCRIPTION OF DRAWINGS

A more complete understanding of the present invention may be accomplished by referring to the following Detailed Description and Claims, when viewed in conjunction with the following drawings:

DETAILED DESCRIPTION OF PREFERRED EMBODIMENT

This invention provides a method and system for improving communications through a communications pipe over a network. In this invention, APDU commands are generated and accumulated in the form of a command script on a remote computer system. Once the command script has been generated, it is then transmitted to a local client for processing and execution by an associated PSD. The resulting APDU responses are likewise accumulated and stored in a response script, which is then returned to the remote computer system following completion of the command script or upon detection of an error condition. By consolidating APDU commands and responses in scripts, significantly less network traffic is generated thus optimizing the use of networking resources and simplifying management of large numbers of PSDs.

Figure 1:
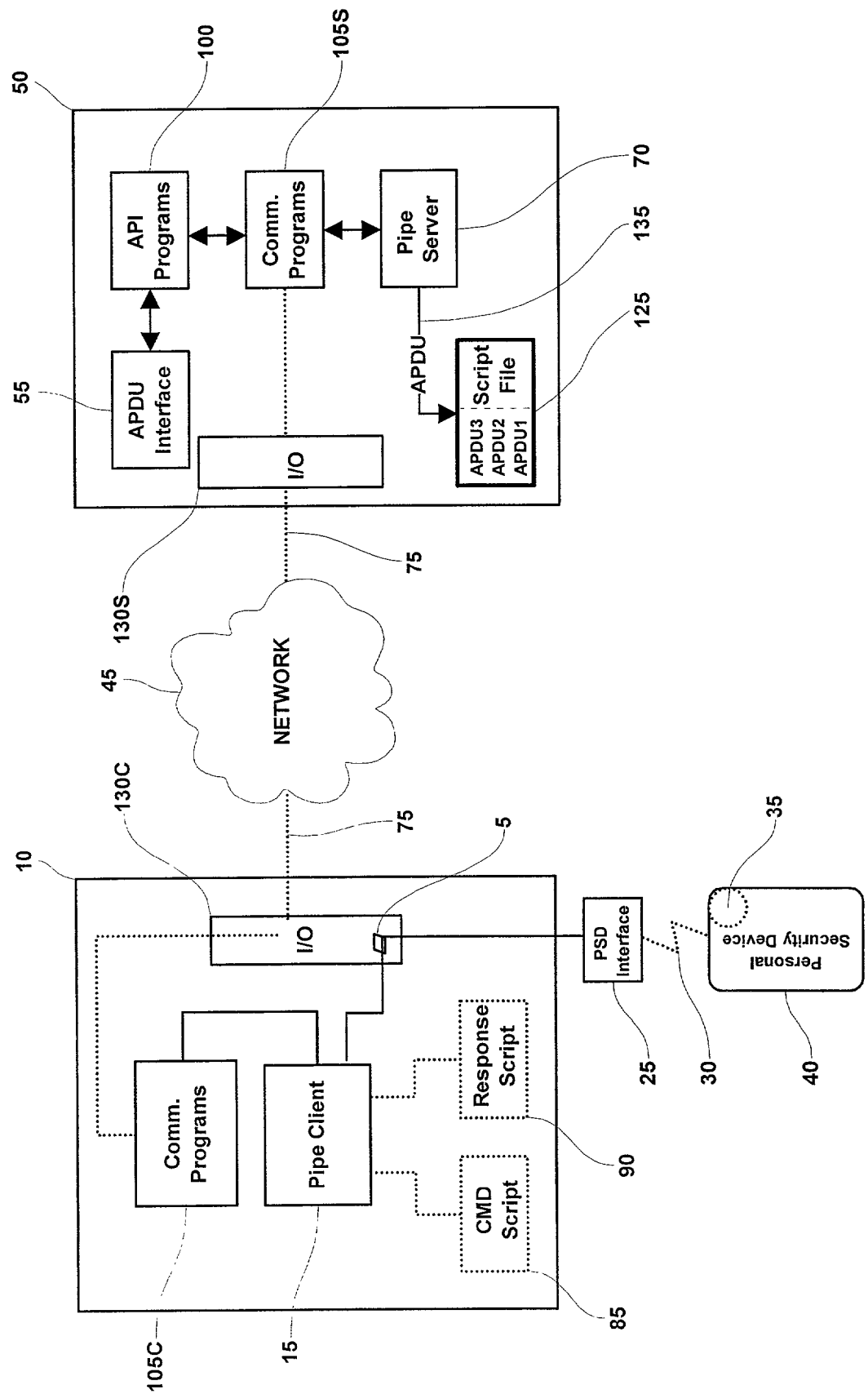
FIG. 1—is a system block diagram depicting a version of the present invention where APDU commands are accumulated in the form of a command script (CMD Script)

Referring to FIG. 1, a block diagram of a local client 10 and a remote computer system 50 are depicted. Remote computer system 50 contains API level programs 100 for generating and interpreting high level commands. High-level commands are translated into the low-level APDU messaging protocol required by a PSD 40 using a specialized API level program called an APDU Interface 55. The APDU Interface 55 also serves to translate incoming APDU messages into higher-level messages for use by the API Programs 100.

A second specialized program contained within the API Level of the Remote Computer System 50 and referred to as a Pipe Server 70, interacts with Communications Programs 105 S contained within the communications layer. The Pipe Server 70 functions to separate encapsulated APDU Responses 90 from incoming messaging packets received from a network 45 for processing by the APDU Interface 55.

Alternately, outbound APDU commands are translated by the APDU Interface 55 and processed by the Pipe Server 70 for accumulation 135 in a Command Script (CMD Script) 125. The Command Script 125 is then encapsulated into an agreed upon communications protocol by the Pipe Server 70 and sent to the Communications Programs 105 S for transmission. The Command Script 125 may be temporarily stored before transmission. Optionally, file compression and cryptographic protection techniques may be employed to improve networking performance and transaction security. The Communications Programs 105 S communicates through the hardware I/O device interface 130 S, which connects the pipe 75 to a network 45 for communicating with at least the Client 10.

The Client 10 likewise communicates using internal Communications Programs 105 C through its hardware I/O device interface 130 C, which connects 75 to the network 45 for communicating with at least the Remote Computer System 50. A third specialized API level program referred to as a Pipe Client 15, interacts with the Communications Programs 105 C. The Pipe Client 15 functions to separate encapsulated Command Scripts 125 from incoming messaging packets received from the network 45. If employed, the Command Scripts 125 are decompressed and/or unencrypted by the Communications Programs 105 C and cryptographic services programs before being processed by the Pipe Client 15. Once the Pipe Client has completed processing, the Command Scripts 85 are temporarily stored. As before, optional file compression and cryptographic protection techniques may be employed to improve local file storage utilization and transaction security.

Alternately, outbound APDU response messages generated by a locally connected PSD 40 are processed by the Pipe Client 15 and temporarily stored in a Response Script (RSP Script) 90. The response APDUs are generated by the PSD 40 following sequential processing of each APDU command contained in the Command Script 85. The APDU responses are communicated through the PSD Hardware Device Interface 25, into the Client 10 via the I/O Device Port 5 and subsequently directed to the Pipe Client 15 by a software driver. The APDU responses are accumulated in the Response Script 90 until the last APDU command is processed and the final APDU response message received and stored. The completed Response Script 90 is then encapsulated into an agreed upon communications protocol by the Pipe Client 15 and transmitted by the Communications Programs 105 C through the pipe 75 and over the network 45. Again, optional file compression and cryptographic protection techniques may be employed to improve networking performance and transaction security.

Figure 2:
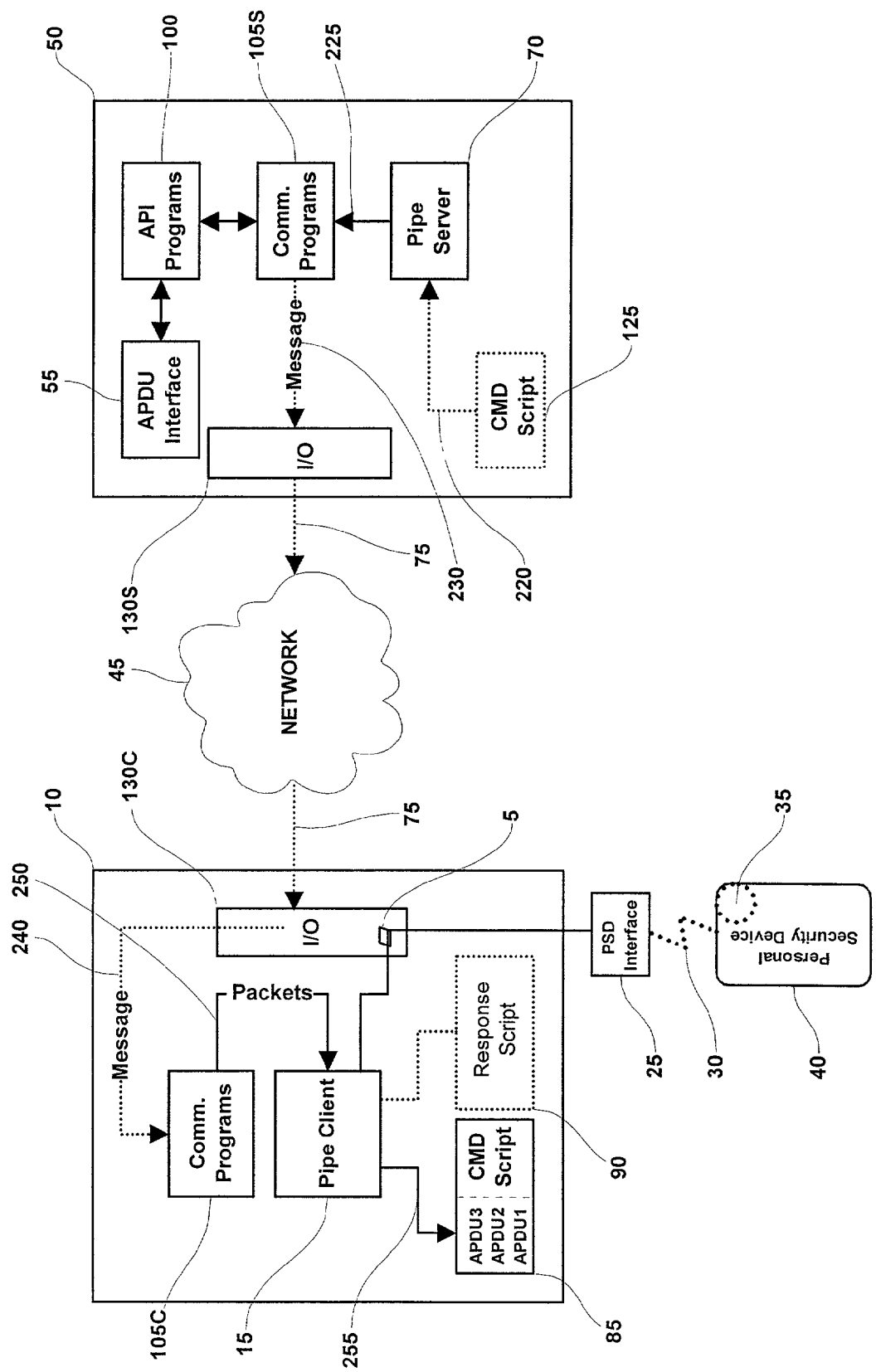
FIG. 2—is a system block diagram depicting a version of the present invention where the command script is transferred to a client for processing.

Referring to FIG. 2, the completed Command Script 125 is retrieved 220 and encapsulated into an agreed upon communications protocol by the Pipe Server 70, routed 225 to the Communications Programs 105 S, incorporated into an outbound Message 230, sent through the Pipe 75, across the Network 45, and received by the Client 10. The Communications Programs 105 C processes the incoming Message 240 and the resulting Packets 250 are routed to the Pipe Client 15 for processing. The Pipe Client 15 extracts 255 and temporarily stores the Command Script 85.

Figure 3:
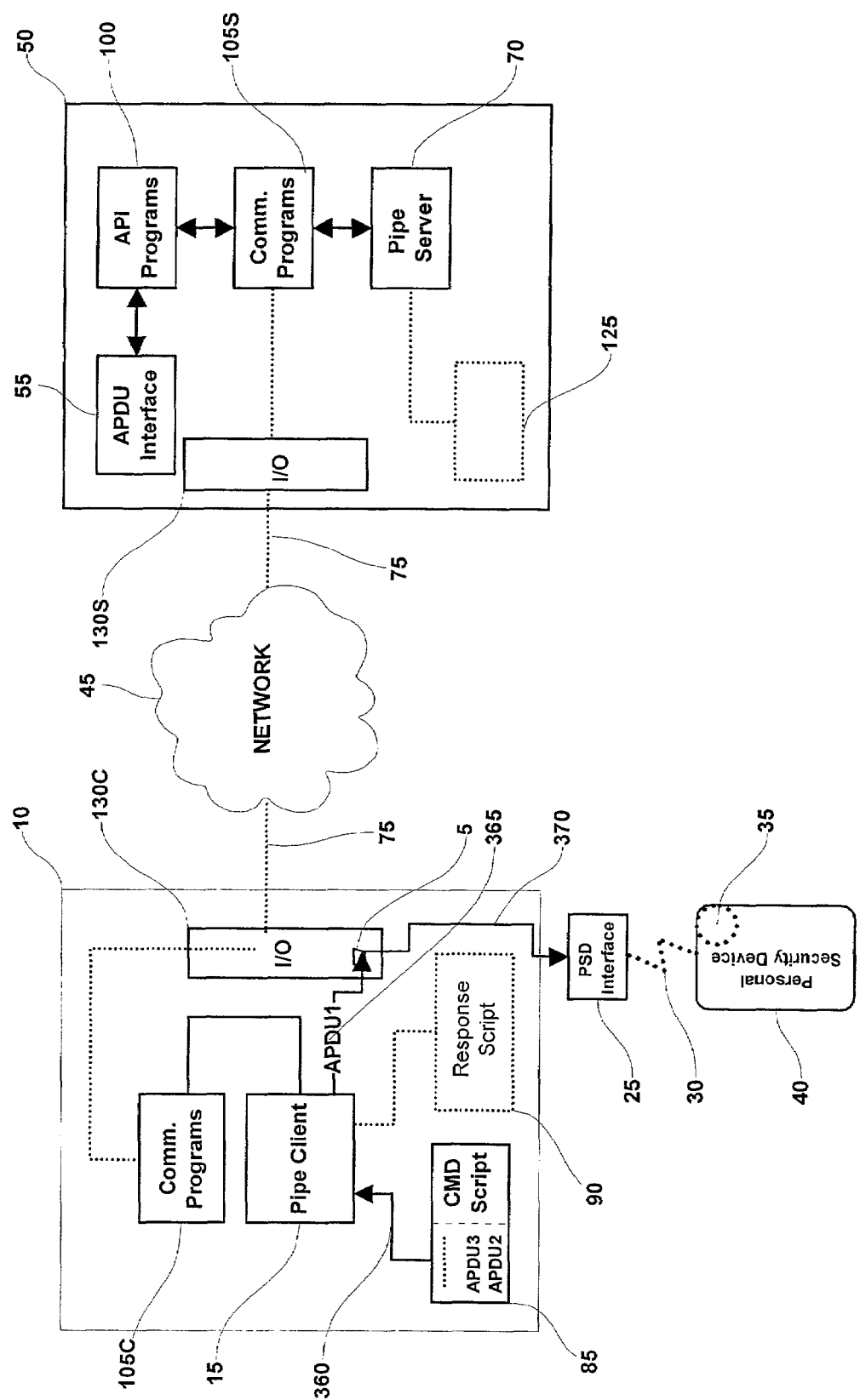
FIG. 3—is a system block diagram depicting a version of the present invention where command APDUs contained in a command script are processed by a pipe client program and sent to a PSD for execution.

Referring to FIG. 3, the Pipe Client 15 retrieves 360 and sequentially processes the command APDUs contained in the Command Script 85. The first APDU command (APDU1) is directed 365 through the I/O Device Port 5 by the software driver and routed 370 to the PSD Interface 25. The PSD Interface 25 directs 30 the APDU command to the PSD 40 and into the processing domain 35.

Figure 4:
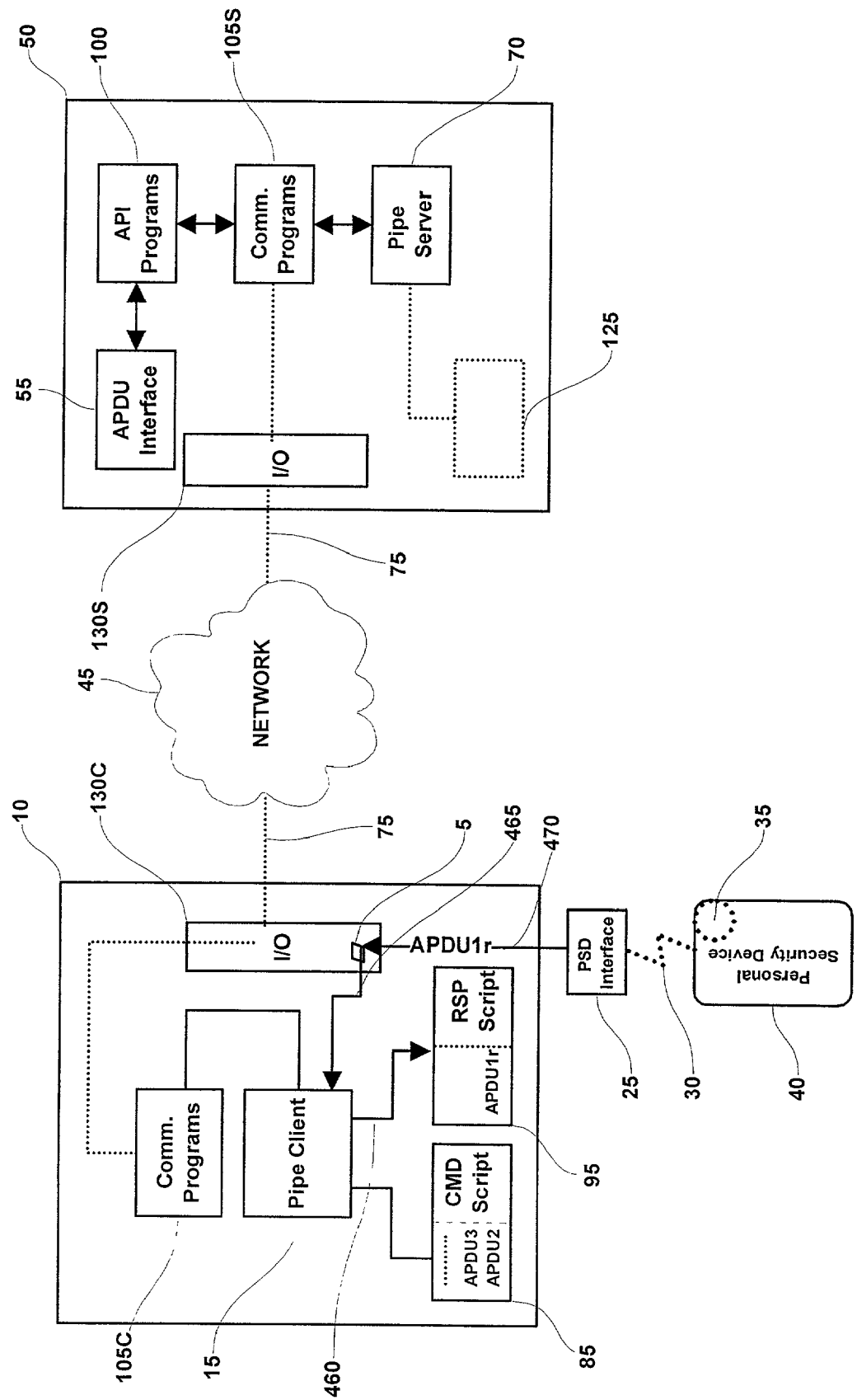
FIG. 4—is a system block diagram depicting a version of the present invention where response APDUs are returned from a PSD, processed by a pipe client program and accumulated in a response script (RSP Script)

Referring to FIG. 4, the PSD 40 upon completing processing of the APDU command (APDU1), generates a response APDU (APDU1r) that is sent 30 to the PSD Interface 25 where it is routed 470 through the I/O Device Port and directed 465 to the Pipe Client 15 by the software driver. The APDU response message (APDU1r) is then processed by the Pipe Client and temporarily stored 460 in a Response Script 95. The receipt and storage of the APDU response message (APDU1r) causes the Pipe Client 15 to issue the next APDU command (APDU2). This process continues until the final APDU command (APDU3) is sent to the PSD 40 and an APDU response message (APDU3r) is received and stored in the Response Script 95. Again, optional file compression and cryptographic protection techniques may be employed to improve networking performance and transaction security.

Figure 5:
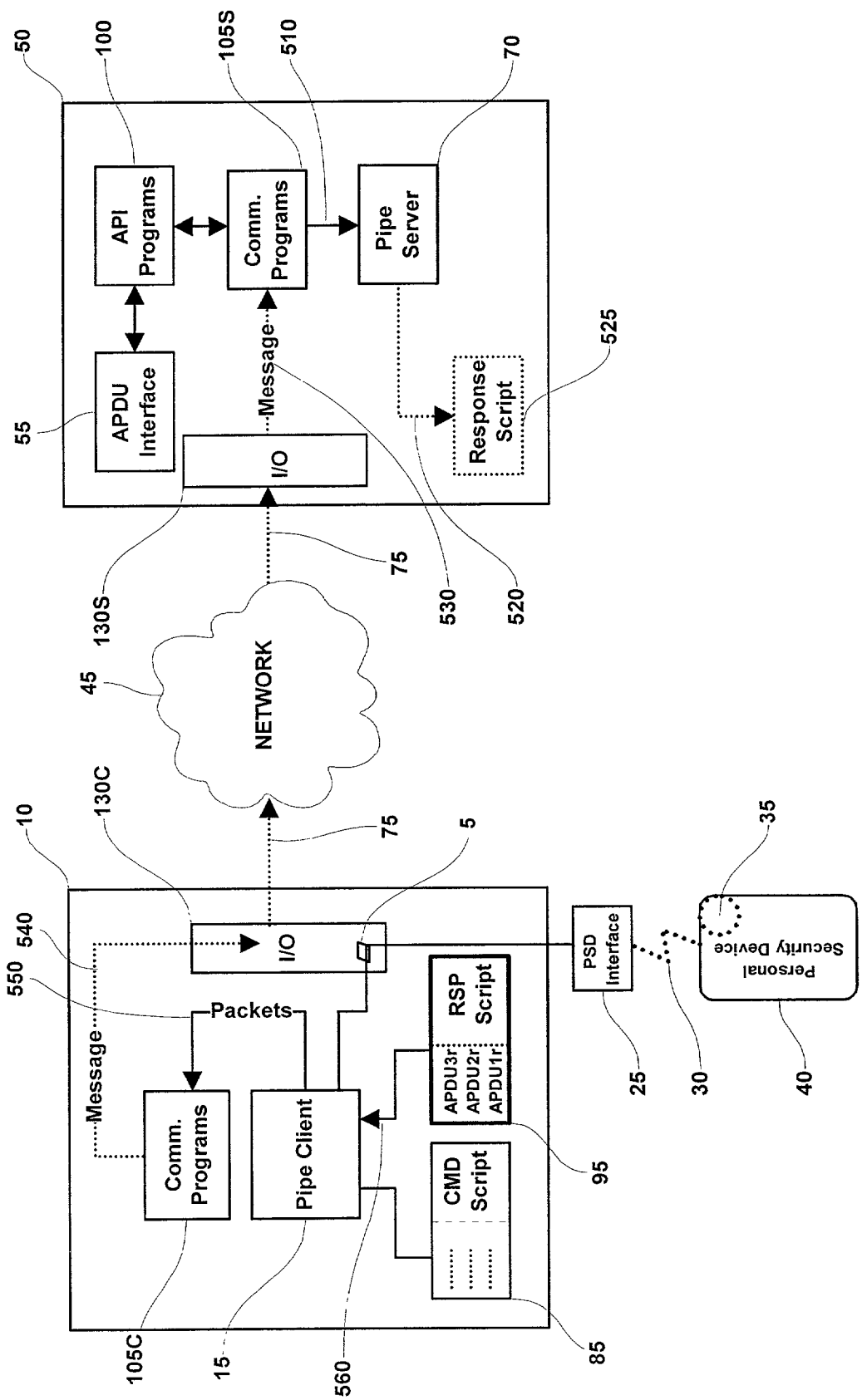
FIG. 5—is a system block diagram depicting a version of the present invention where the response script containing the accumulated APDUs is returned to a remote computer system for processing.

Referring to FIG. 5, the completed Response Script 95 is retrieved 560 and processed by the Pipe Client and encapsulated into an agreed upon communications protocol, routed 550 to the Communications Programs 105 C, incorporated into an outbound Message 540, sent through the Pipe 75, across the Network 45, and received by the Remote Computer System 50. The Communications Programs 105 S processes the incoming Message 530 and the resulting packets 525 are routed 510 to the Pipe Server 70 for processing. The Pipe Server 70 extracts 520 and temporarily stores the Response Script 525.

Figure 6:
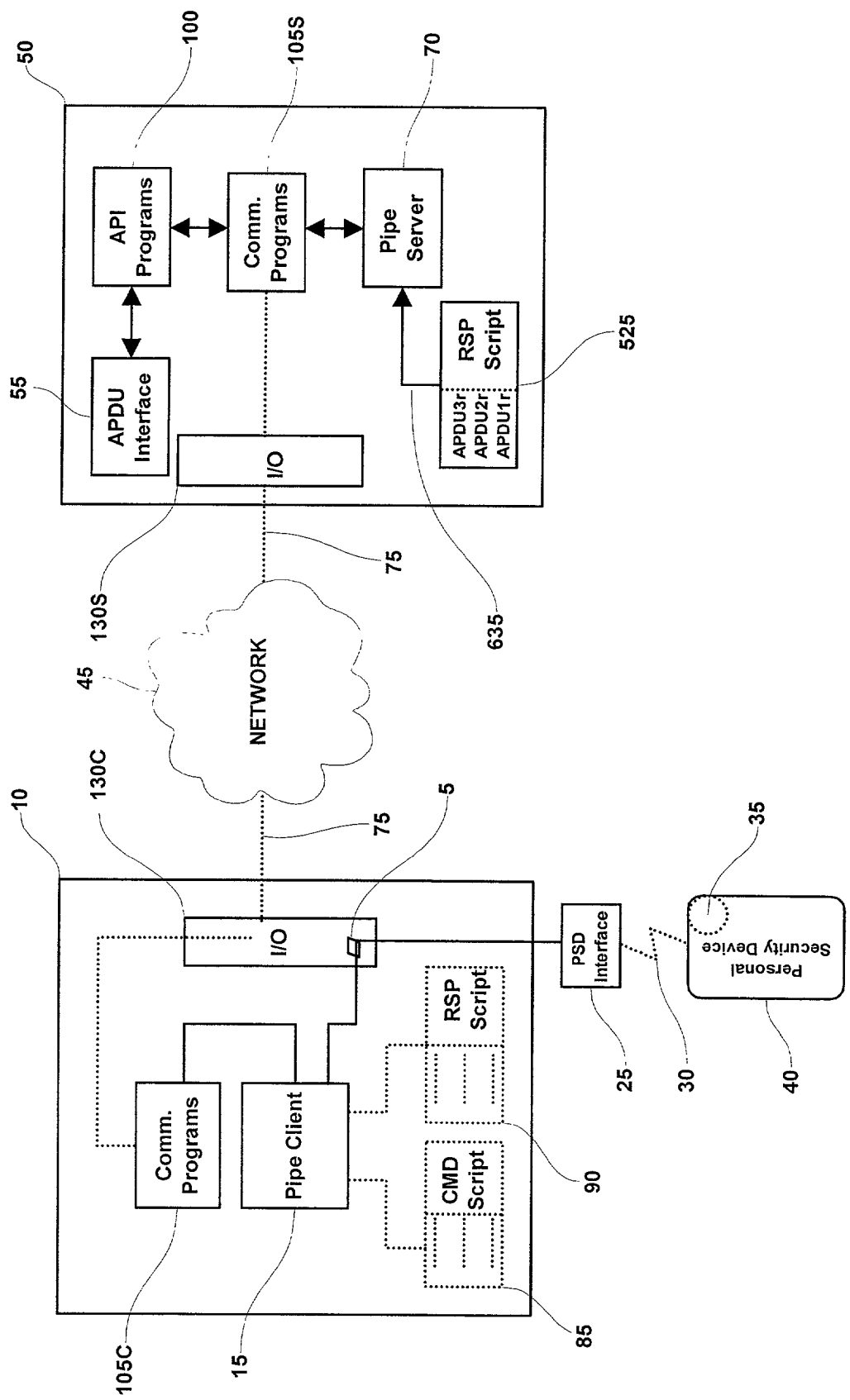
FIG. 6—is a system block diagram depicting a version of the present invention where response APDUs are processed by a pipe server program installed in a remote computer system.

Referring to FIG. 6, the Pipe Server 70 retrieves 635 and sequentially processes the APDU response messages, which are sent to the APDU Interface 55 through the Communications Programs 105 S and the API Programs for processing. The processed messages are then sent back to the API Programs 100 for translation into higher-level messages.

What is claimed:

1. A system for optimizing communications through at least one communications pipe over at least one network, comprising at least one client, a PSD, at least one remote computer system, and at least one network, wherein:

said at least one network includes means for functionally connecting and communicating with said at least one client and said at least one remote computer system;

said at least one client comprises means for functionally connecting to a PSD interface and said at least one network, means for functionally communicating over said network with said at least one remote computer system and means for establishing a communications pipe; said means for establishing a communications pipe further comprising:

client communications means for transmitting and receiving message packets over said at least one network using a packet based communications protocol, and for transmitting and receiving APDUs through said PSD Interface;

first client data processing means for receiving incoming message packets from said at least one remote computer system using said client communications means, separating encapsulated APDUs from said incoming message packets thus generating desencapsulated APDUs and routing said desencapsulated APDUs to said PSD through said PSD Interface independently of the origin and integrity of said incoming message packets; and second client data processing means for receiving incoming APDUs from said personal security device interface, encapsulating said incoming APDUs into outgoing message packets and routing said outgoing message packets to said at least one remote computer system through said client communications means;

said at least one client further comprises data storage means, wherein:

said data storage means includes means for storing at least one command script received from said at least one remote computer system, wherein said at least one command script includes one or more APDU formatted commands for execution by said PSD;

said first client data processing means includes means for sequentially routing said one or more APDU formatted commands included in said at least one command script to said PSD;

said PSD further comprises data processing means and communications means, wherein said PSD is functionally connected to said at least one client and in processing communications with said at least one remote computer system through said at least one communications pipe over said at least one network;

said at least one remote computer system comprises data processing means, data storage means and communications means, wherein:

said at least one remote computer system is in processing communications with said at least one client over said at least one network;

said at least one remote computer system is in processing communications with said PSD through said at least one communications pipe over said at least one network;

said data processing means includes means for generating said at least one command script, wherein said at least one command script includes one or more APDU formatted commands for data processing by said PSD;

said data storage means includes means for storing said at least one command script; and said communications means includes means for sending said at least one command script to said at least one client over said at least one network.

2. The system according to claim 1, wherein said PSD data processing means includes means for generating APDU responses to said one or more APDU formatted commands included in said at least one command script.

3. The system according to claim 2, wherein said PSD communications means includes means for sending said APDU responses to said at least one client.

4. The system according to claim 1, wherein said at least one command script is compressed during transmission.

5. The system according to claim 1 or 4, wherein said at least one command script is cryptographically protected.

6. The system according to claim 1, wherein said at least one client's data storage means includes means for storing said APDU responses received from said PSD in at least one response script.

7. The system according to claim 6, wherein said at least one response script is cryptographically protected.

8. The system according to claim 6 or 7 wherein said at least one response script is sent to said at least one remote computer system over said at least one network.

9. The system according to claim 8, wherein said at least one response script is compressed during transmission.

10. The system according to claim 1, wherein said at least one remote computer system's data processing means includes means for analyzing said APDU responses sent by said at least one client.

11. A method for optimizing communications through at least one communications pipe over at least one network comprising:

establishing a communications pipe between a PSD and at least one remote computer system over at least one network and using at least one client as a communications host for said PSD, wherein said at least one client and said at least one remote computer system are in functional communication using a packet based communications protocol over said at least one network, and wherein transmitting a first message from said at least one remote computer system to said PSD through said communications pipe comprises:

generating said first message on said at least one remote computer system, wherein said first message is in a non-native protocol for communicating with said PSD and said first message is generated by an API Level Program, converting on said at least one remote computer system said first message from said nonnative protocol into a first APDU format message using a first server data processing means, encapsulating on said at least one remote computer system said first APDU format message into said packet based communications protocol producing a first encapsulated message, using a second server data processing means, transmitting said first encapsulated message over said at least one network using said packet based communications protocol, receiving by said at least one client said first encapsulated message sent over said at least one network, processing said first encapsulated message using a first data processing means to separate said first APDU format message from said first encapsulated message, routing on said at least one client said first APDU format message through a hardware device port assigned to a PSD Interface independently of the origin and integrity of said first encapsulated message, wherein said PSD Interface is in processing communication with said PSD;

and wherein transmitting a second message from said PSD to said at least one remote computer system through said communications pipe comprises:

generating said second message in APDU format by said PSD using a second internal PSD data processing means and transmitting said second APDU format message through said PSD Interface, receiving by said at least one client said second APDU format message through said PSD Interface and encapsulating said second APDU format message into said packet based communications protocol producing a second encapsulated message, using a second data processing means, transmitting said second encapsulated message over said at least one network using said packet based communications protocol, receiving said second encapsulated message sent over said at least one network by said at least one remote computer system, processing said second encapsulated message using a third server data processing means to separate said second APDU message from said second encapsulated message thus generating a second desencapsulated APDU message, converting by said at least one remote computer system said second desencapsulated APDU message into a second message in a non-native protocol using a forth server data processing means, and forwarding said second message to at least one API Level Program;

generating one or more commands on said at least one remote computer system;

transmitting said one or more commands from said at least one remote computer system to said PSD through said communications pipe by further:

converting said one or more commands into one or more APDU format commands, generating at least one command script including said one or more APDU format commands, encapsulating said at least one command script instead of each of said one or more APDU format commands in order to transmit said at least one encapsulated command script to said at least one client, receiving said at least one command script by said at least one client;

temporarily storing said at least one command script by said at least one client, sequentially routing by said at least one client said one or more APDU formatted commands included in said at least one command script to said PSD, receiving said one or more APDU formatted commands by said PSD, processing said one or more APDU formatted commands by said PSD, generating one or more APDU responses in response to each said one or more APDU formatted commands by said PSD, transmitting said one or more APDU responses from said PSD to said at least one remote computer system through said communications pipe by further:

sending said one or more APDU responses to said at least one client, receiving said one or more APDU responses by said at least one client, storing said one or more APDU responses by said at least one client in at least one response script, encapsulating said at least one response script instead of each of said one or more APDU responses in order to transmit said et least one encapsulated response script to said at least one remote computer system, transmitting said at least one response script by said at least one client over said at least one network to said at least one remote computer system;

storing said at least one response script by said at least one remote computer system, and processing said at least one response script by said at least one remote computer system.

12. The method according to claim 11, wherein said at least one command script is sent compressed.

13. The method according to claim 11, wherein said at least one command script is sent cryptographically protected.

14. The method according to claim 11, wherein said at least one response script is sent compressed.

15. The method according to claim 11, wherein said at least one response script is sent cryptographically protected.

16. A method for optimizing communications through at least one communications pipe over at least one network comprising:

establishing a communications pipe between a PSD and at least one remote computer system over at least one network and using at least one client as a communications host for said PSD, wherein:

said at least one client and said at least one remote computer system are in functional communication using a packet based communications protocol over said at least one network, said method comprising the local client transmitting and receiving message packets respectively to and from said remote computer system over said network using a packet based communications protocol, and transmitting and receiving APDUs through said PSD interface, transmitting a first message from said at least one remote computer system to said PSD through said communications pipe comprises the local client receiving incoming message packets from said remote computer system, separating encapsulated APDUs from said incoming message packets thus generating desencapsulated APDUs and routing said desencapsulated APDUs to said PSD through said PSD Interface, and transmitting a second message from said PSD to said at least one remote computer system through said communications pipe comprises the local client receiving incoming APDUs from said PSD interface, encapsulating said incoming APDUs into outgoing message packets and routing said outgoing message packets to said remote computer system generating one or more commands on said at least one remote computer system;

transmitting said one or more commands from said at least one remote computer system to said PSD through said communications pipe by further:

converting said one or more commands into one or more APDU format commands, generating at least one command script including said one or more APDU format commands, encapsulating said at least one command script in order to transmit said at least one encapsulated command script to said at least one client, receiving said at least one command script by said at least one client;

temporarily storing said at least one command script by said at least one client, sequentially routing by said at least one client said one or more APDU formatted commands included in said at least one command script to said PSD, receiving said one or more APDU formatted commands by said PSD, processing said one or more APDU formatted commands by said PSD, generating one or more APDU responses in response to each said one or more APDU formatted commands by said PSD, transmitting said one or more APDU responses from said PSD to said at least one remote computer system through said communications pipe by further:

sending said one or more APDU responses to said at least one client, receiving said one or more APDU responses by said at least one client, storing said one or more APDU responses by said at least one client in at least one response script, encapsulating said at least one response script in order to transmit said et least one encapsulated response script to said at least one remote computer system, transmitting said at least one response script by said at least one client over said at least one network to said at least one remote computer system;

storing said at least one response script by said at least one remote computer system, and processing said at least one response script by said at least one remote computer system.

* * * * *